US006840495B2

United States Patent
Jähn et al.

(10) Patent No.: US 6,840,495 B2
(45) Date of Patent: Jan. 11, 2005

(54) MODULAR, PNEUMATICALLY OPERATED CONTROL VALVE (75) Inventors: Peter Jähn, Leverkusen (DE); Rainer Krautkrämer, Bergisch Gladbach (DE); Emil Ferver, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 56 days.

(21) Appl. No.: 10/302,361

(22) Filed: Nov. 22, 2002

(65) Prior Publication Data

US 2003/0111622 A1 Jun. 19, 2003

(30) Foreign Application Priority Data

Dec. 14, 2001 (DE) .......................... 101 61 388

(51) Int. Cl.⁷ .................. F16K 31/143; F16K 31/163; F16K 31/363; F16K 31/383
(52) U.S. Cl. ...................... 251/63.5; 137/901
(58) Field of Search .............. 251/63.5, 63.6, 251/324, 82, 367; 137/901

(56) References Cited

U.S. PATENT DOCUMENTS

| 3,624,802 A | 11/1971 | Ripert ................... 251/31 |
| 3,958,592 A | 5/1976 | Wells et al. ............ 137/315 |
| 6,386,508 B1 * | 5/2002 | Steil et al. ............. 251/31 |
| 2002/0024034 A1 | 2/2002 | Hall |

FOREIGN PATENT DOCUMENTS

GB  1 216 701  12/1970  .......... F16K/41/04

* cited by examiner

Primary Examiner—Edward K. Look
Assistant Examiner—John K. Fristoe, Jr.
(74) Attorney, Agent, or Firm—Norris McLaughlin & Marcus PA (57) ABSTRACT A modular, actuated valve controlled by means of pressure fluids comprising a head plate mounted on a housing plate mounted on a base plate, held together by screws, having a piston with attached valve spindle and a pressure relief space provided between the flow passage 28, 29 and the piston.

29 Claims, 7 Drawing Sheets

MODULAR, PNEUMATICALLY OPERATED CONTROL VALVE

BACKGROUND OF THE INVENTION

Actuated miniaturized process valves for high pressures, for example, pressures higher than 300 bar, are usually constructed of a valve body, an electric or pneumatic actuator and a connecting mounting unit. This makes it necessary for the valves to have spatially large forms of construction. If the valve is required to assume a defined safety (i.e., "fail safe") position in the event of the failure of control energy, the valve actuators and consequently the controllable valve become disproportionably larger. For automated and miniaturized test installations, actuated gas-tight valves with spatial dimensions smaller than 50 ml are required, so that a compact installation set-up is possible. For this reason, in particular, known actuated control valves are too large, and therefore unsuitable, for use in miniaturized and automated test installations. All known valves are very similar in terms of construction.

The construction of known valves varies, as a rule, in terms of the configuration of the sealing seat, the form of the valve tappet and valve sealing seat and also the material combination of the valve tappet and valve sealing seat. Control valves which are normally primarily intended for a continuous regulating function do not always require high degrees of leak-tightness in the closed position. In many production plants, therefore, auxiliary downstream and upstream leak-tight OPEN/SHUT fittings are installed.

Operational valves, in the closed position, must be leak-tight in the product passage and relative to the outside. The valve seat and the valve-spindle seal therefore have to satisfy leak-tightness requirements, particularly where a large number of switching cycles are concerned. The two necessary sealing points important for functioning require a high sealing force in order to seal against high process pressures. The sum of the sealing force and the frictional force in the valve determine the size of the pneumatic drive which is necessary. This leads, as a rule, to very large actuating drives.

One possibility for the design of a pressure-resistant valve is described in the published specification EP 742 398 A1.

This valve has a cavity which is filled with compressible supporting medium and through which the valve spindle is moved and which is separated from the flow passage of the valve by means of an elastic diaphragm.

The disadvantage of such a design is that, over the course of a comparatively large number of actuations of the valve (>10,000 switching cycles), the diaphragm may become leaky or may tear. The product then leaks from the flow passage or valve process space into the interspace between the valve spindle and valve body and ultimately even possibly into the surroundings.

Valves have to execute long travels for a complete closing movement between the end positions OPEN and SHUT, and therefore the construction of a spindle seal, particularly where prevailing high process pressures are concerned, becomes complicated and expensive. For example, multi-part or multiple seals with the possibility of resilient adjustment are employed. The possibility of adjustment of a spindle seal compensates for the seal abrasion occurring during the to-and-fro movement of the spindle, so that the spindle seal is pressed down by a resilient component and continues to remain leak-tight. If a valve with a seal design of this type is used, the service life of the seal under continuous process conditions and with a low frequency of movement of the valve spindle is very long, because there is virtually no wear at the spindle seal. If, however, this valve is used for a task in which the full actuating range (actuating travel) is covered constantly, so that the valve is constantly moved between the end positions OPEN and SHUT, pronounced abrasion occurs at the spindle seal, so that a design-based adjustment possibility is quickly used up, the spindle seal is no longer leak-tight and a leakage occurs. The result of this is that such designs of spindle seals are not suitable in valves for high process pressures, such as, for example, 300 bar hydrogen.

In view of these problems, there are diaphragm and bellows-type valves, such as that described above, which do not require adjustable valve-spindle seals and are intended to ensure permanent leak-tightness between the process space and the atmosphere. These valves require high displacement forces, because the diaphragms or bellows consist of metallic materials, so that the high process pressures of, for example, pressures above 300 bar, can be withstood. If, in addition to the high pressure differences, high switching frequencies of, for example, 10 to 60 switches per minute, are also required, diaphragms and bellows are exposed to high degrees of alternating stress. The alternating stress generates high material tensions in the material of the diaphragms or bellows, so that, in the case of miniaturized valves, material fatigue and therefore failure of the metal seal components quickly occur. The mechanical stress on the diaphragms and bellows can be reduced by increasing their dimensions and thereby reducing their specific load. The design-based increase in size of the diaphragm or bellows requires an increase in the effort for the valve-spindle movement, so that the construction size of the actuating drive and therefore of the controllable valve increases. Valves of this type are not suitable for compact miniaturized test installations.

A further problem is the leak-tightness of the valve seat. Known valves seal off in the passage over a concentric area. Large-area sealing-off requires high pressure forces in order to achieve gas-tightness in the case of high prevailing pressure differences of, for example, higher than 300 bar. The closure of the flow passage is usually formed from the seat in the valve housing and from the lower part of the valve spindle. The sealing seat in the housing is in this case stationary, and the lower part of the spindle, what is known as the spindle tip, is pressed into the sealing seat of the housing by means of the actuating drive, so that the flow passage is closed. Horizontal large-area sealing-off of the flow passage balances a parallel axial shift between spindle and housing seat within small ranges, so that low manufacturing tolerances are compensated. The spindle tip and the valve seat form a sealing exactly fitting closure point, particularly when the valve-spindle tip possesses a softer material sealing ring and the soft material assumes the form of a counterface of the housing sealing seat as a result of plastic deformation. If high switching frequency leads to increased wear in the region of the spindle seal, the original low position tolerance is increased appreciably and the spindle tip can no longer move into the exactly fitting sealing seat first formed and close the valve passage in a leak-tight manner. This insufficiently fitting closure after the first wear in the sealing region of the spindle can be balanced again by the actuating drive having larger dimensioning. With increased force, a new subsequent deformation of the softer sealing material at the spindle tip becomes possible. Identical actions take place when a softer material is used in the valve seat instead of at the valve-spindle tip. The valve types thus produced have only a short service life in the case of a high differential pressure applied by the gas and in the case of frequent rapid switching cycles.

Many flow passages or valve sealing seats are configured in such a way that sealing takes place over a concentric line. In these instances, too, material combinations are the state of the art. Although such versions of the valve sealing seats require lower closing forces, so that the necessary actuating drive can be small, the positional sensitivity with regard to an angular offset between valve spindle and sealing seat is nevertheless increased substantially. The least possible axial variation in the region of the valve-spindle guide and the spindle seal changes the position of the concentric linear seal and results in leakages in the flow passage.

Investigations on various commercially available valves confirm that, in the case of a hydrogen load under a pressure of up to 300 bar, with high pressure differences between the two sides of the valve, i.e., between the inlet and outlet, there was initially high leak-tightness. On account of the rapid and high switching frequency, the valves showed first leakages after fewer than 10,000 load cycles. Those valves which were able to remain leak-tight even after a larger number of switching cycles had substantially larger drive and large valve forms of construction, and therefore the use of such valves in miniaturized installations would be too complicated and too cost-intensive.

The invention is therefore based on the following object: A pneumatically actuated valve is to be found, which is gas-tight, for example, under extreme process requirements, for example a pressure higher than 300 bar, and with hydrogen as process gas, and, at the same time, a high differential pressure of, for example, higher than 100 bar, even in the case of a number of at least 100,000 switching cycles. The valve is to have a form of construction that can be miniaturized. In addition, the switching time required for an OPEN/SHUT movement of the valve should be extremely short. The valve is to have low wear under continuous maximum load. In special applications, there is, in particular, to be the possibility of using a spring in the pneumatic head, without changing the degree of miniaturization, so that, in the event of the failure of control air (driving air), the valve assumes a predetermined safety, i.e., "fail safe", position. The set-up of the valve is to compensate for manufacturing and position tolerances as far as possible, so that, along with a high degree of miniaturization, valve costs can be greatly reduced.

Preferably, the design is to be repair-friendly and maintenance-friendly, so that, in the event of valve failure, the valve can be easily and simply repaired. The valve is to be capable of being produced in a simple way, so that, even in the manufacture of customized individual valves, there is a marked cost benefit, as compared with commercially available valves.

In chemical processes, corrosion-resistant materials in the form of high-grade metal alloys are often used, and therefore there is also the requirement for a cost-effective valves consisting of similar corrosion-resistant materials, such as, for example, of Hastelloy™ nickel-based alloys.

SUMMARY OF THE INVENTION

The subject of the invention is a valve with a pneumatic or hydraulic actuator, with a flow passage passing through the valve housing, a valve seat in the flow passage and with a closing mechanism movable relative to the valve seat and consisting of two components: a valve spindle with a piston fixedly connected on one side and a separate freely movable closing body, the piston being arranged in a cavity, in particular a cylinder space, and dividing the cavity into an upper and a lower cavity and being guided movably therein, and also with a fluid pressure line connected to the upper cavity part and a lower fluid pressure line connected to the lower cavity part, wherein the closing mechanism above the flow passage traverses a centering plate which has a pressure relief space and has seals, in particular sealing rings, which separate the pressure relief space from the flow passage and from the lower cavity part.

The valve with an integrated pneumatic drive has, for example, a modular plate-shaped assembly with at least three plates including a lower base-plate, an adjacent middle housing plate and a placed-on upper head plate. The plates are plugged together, in particular on the inside, with rotationally symmetrical centering built-in parts and with a pneumatic piston having a valve spindle elongated on one side, and all the built-in parts sealed off relative to one another by means of elastic seals, so that four separate spaces or chambers upon which pressure acts differently are obtained, that is to say the upper and the lower cavity (pneumatic space), a pressureless separating space (pressure relief space) and the process-side high-pressure space (flow passage). The valve spindle elongated on one side allows force transmission between three spaces acted upon by pressure, so that the active force is transmitted from the upper or lower pneumatic space into the process space (flow passage) and a, for example, freely movable closing body is thereby pressed into a valve seat or released and the flow passage of the valve is consequently opened or closed.

Such a sealingly closing, modularly assembled valve satisfies all requirements as to high differential pressures applied by compressed gases with high diffusion coefficients, such as, for example, hydrogen. The differential pressures amount to up to 350 bar, and, due to the small upper pneumatic space, the valve has a short closing time.

DETAILED DESCRIPTION

In a preferred version the present invention is a valve comprising a head plate 1 mounted on a housing plate 2 which is mounted on a base plate 6 said plates being sealed and held together with fixing elements such as for example screws or bolts, the head plate having a bore which forms a pneumatic space; a piston disposed within said pneumatic space, and dividing said pneumatic space into an upper pneumatic space 32 and a lower pneumatic space 33, an upper fluid pressure line 26 connected to said upper pneumatic space 32 and a lower fluid pressure line 27 connected to said lower pneumatic space, a valve spindle 31 attached to said piston, a closing plate 4 having a bore for passage of said spindle and closing said lower pneumatic space 33 and a spindle seal 13 to seal the lower pneumatic space relative to the spindle 31; an inner centering plate 5 having an upper side and a lower side, the upper side being seated in said closing plate 4 and the lower side being seated in said housing plate 2, said inner centering plate 5 having a bore for passage of said spindle 31, a spindle seal 16 and a radial bore 34 communicating with said bore for passage of said spindle 31, a peripheral grove 35 on the periphery of said inner centering plate 5, said peripheral grove 35 communicating with said radial bore 34 and with a radial housing bore 30 passing through said housing plate 2, said spindle passing along the bores in said closing plate 4 and centering plate 5 to a flow passage defined by an inlet bore 28 through said base plate 6 and an outlet bore 29 through said housing plate 2 communicating with each other; a primary bore in said base plate 6 for receiving a valve seat 7, a valve seat 7 disposed within said primary bore and having an upper central bore 36 for receiving a freely movable closing body 25 and an adjoining further bore 37 though which said upper central bore 36 communicates with said inlet 28, with a sealing area 38 between said upper central bore 36 and said further bore 37, adapted to be sealed off by said freely movable closing body 25, said spindle 31 being movable towards and against said freely moving body 25 to force it against said sealing area 38 thereby closing said further bore 37, and thus said fluid passage, or away from said freely movable body thereby freeing said freely movable body to move off of said sealing area 38 to open said fluid passage.

The individual valve components have to be fixed to each other. Suitable fixing elements according to the present invention can be releasable or non-releasable.

In case that the valve is intended to be capable of being dismantled, releasable fixing elements should be used, such as for example screws, nuts and bolts, threaded pins or other tensioning elements.

In case that the assembled valve components are connected to each other in a non-releasable form, due to the adjusting spindle, the travel of the valve spindle can be subsequently adjusted to suit special process requirements. In this case non-releasable connecting elements are used, for example, rivets, welded bolts or threaded pins.

The valve components such as head plate 1, closing plate 4, centering plate 5 valve seat 7, housing of the valve seat 8 or base-plate 6 are preferably made of metal. Preferred materials are chrome-nickel-steal, nickel-based alloys and non-iron materials for the process side of the valve. The pneumatic side of the valve can be made by aluminum or brass.

Of the four spaces separated from one another, at least two are constantly acted upon by a different pressure during operation.

The valve has several pressure chambers. Starting from the top, there is the upper pneumatic chamber 32 and then the lower pneumatic chamber 33. The pneumatic chambers can also be referred to as low pressure chambers. They are followed by the pressure relief chamber, which can perhaps be more aptly referred to as the pressure-less chamber, since the interior of the valve communicates with the external pressureless atmosphere. Beneath the pressureless chamber the high pressure or process chamber comprising the flow passage is located. If the seals 16 fail to function properly, leaks can be directly discharged via the pressure relief chamber or the pressureless chamber, so that there can be no escape of the product from the process chamber into the pneumatic chamber.

The pressureless chamber can for example be used for introducing an inert substance at a pressure which is possibly higher than the prevailing process pressure, into between the process chamber (the flow passage) and the pneumatic chamber. Particularly in the case of highly toxic products care must frequently be taken to ensure that substances do not enter the atmosphere.

The pressure relief chamber or pressure relief space may be acted upon by an inert gas or an inert liquid, in order to apply a blocking pressure between the process space and the lower pneumatic space.

The applied blocking pressure may be monitored by means of a pressure sensor, so that, in the event of a deviating pressure, an alarm is triggered and a process is automatically brought into a safety mode.

The pneumatically or hydraulically controlled valve at the same time assumes the function of a non-return valve, i.e.,
a "check valve", if a freely movable closing body is built in vertically and used in the sealing seat, so that, if a reversed differential pressure suddenly occurs, that is to say the process pressure acting in the discharging housing bore is higher than the prevailing pressure in the feed line of the baseplate, a backflow from the process is prevented. The non-return valve function may be disabled if the valve is rotated through 180 degrees during assembly, so that the head plate is positioned at the bottom.

In a preferred version of the valve, that area of the piston which is acted upon with pressure by the pressure fluid and the resultant force are dimensioned, in relation to the cross section of the sealing area of the valve seat, at least such that, when the upper cavity is acted upon by pressure, the valve spindle counteracts the pressure in the inlet region of the flow passage 36 and prevents a flow through the flow passage.

After mounting of the piston with a one side elongated spindle the remaining free height of the lower and upper cavities of the head plate are preferred to be equal and such that the total opening travel is 0.01 mm to about 10 mm and preferably 0.01 mm to about 5 mm and particularly preferably 0.01 mm to about 1 mm.

The ratio between the cross-sectional area of the pneumatic piston and the cross-sectional area of the valve spindle defines the increase in the valve closing force. Based on the underlying process pressure beneath the closing body and the force resulting therefrom, the force of the valve spindle acting on the closing body should be two times greater than the counteracting process force (the underlying process pressure).

Thus, the ratio between the cross-section is >2 to <100; preferably >2 to <50 and particularly preferably >2 to <20.

The seals used in the valve in the region of the spindle are produced, in particular, independently of one another, as elastic soft seals, toroidal sealing rings, lip seals, elastic form seals or, in particular, as sliding seals.

Elastomers, such as silicone, Viton™ fluoroelastomer, Teflon™ tetrafluoropoly-ethylene or an ethylene-propylene terpolymer (EPDM) rubber, are used particularly preferably as materials for the seals, while the cross-sectional forms of the sealing rings may have round, square or else other specific cross-sectional forms.

A valve is therefore preferred in which the valve housing has a multi-part design and there is at least one division into a head plate for receiving the cavity, a housing plate for receiving the pressure relief space and the flow passage duct and a baseplate.

A variant in which the valve seat is mounted so as to be releasable from the valve housing is particularly preferred.

The ratio of the cross-sectional area of the pneumatic piston to the cross-sectional area of the valve spindle elongated on one side, in the region of the valve seat (i.e. the cross-sectional area of the spindle tip), is 2 to 100, preferably 2 to 50 and particularly preferably 2 to 20.

The effective piston area acted upon by pressure, with the valve spindle attached on one side and having a smaller cross-sectional area, gives rise to a positive force step-up and force transmission to the freely movable smaller closing body and the effective sealing area of the latter, so that, even under high differential pressures, the valve can be closed sealingly with a low actuating force.

The valve optionally includes, in the upper part of the valve housing, a set screw, for example an adjusting spindle, particularly preferably a micrometer screw, by means of which the upper end point of the piston and consequently the stroke of the valve spindle can be set and limited.

Figure 1:
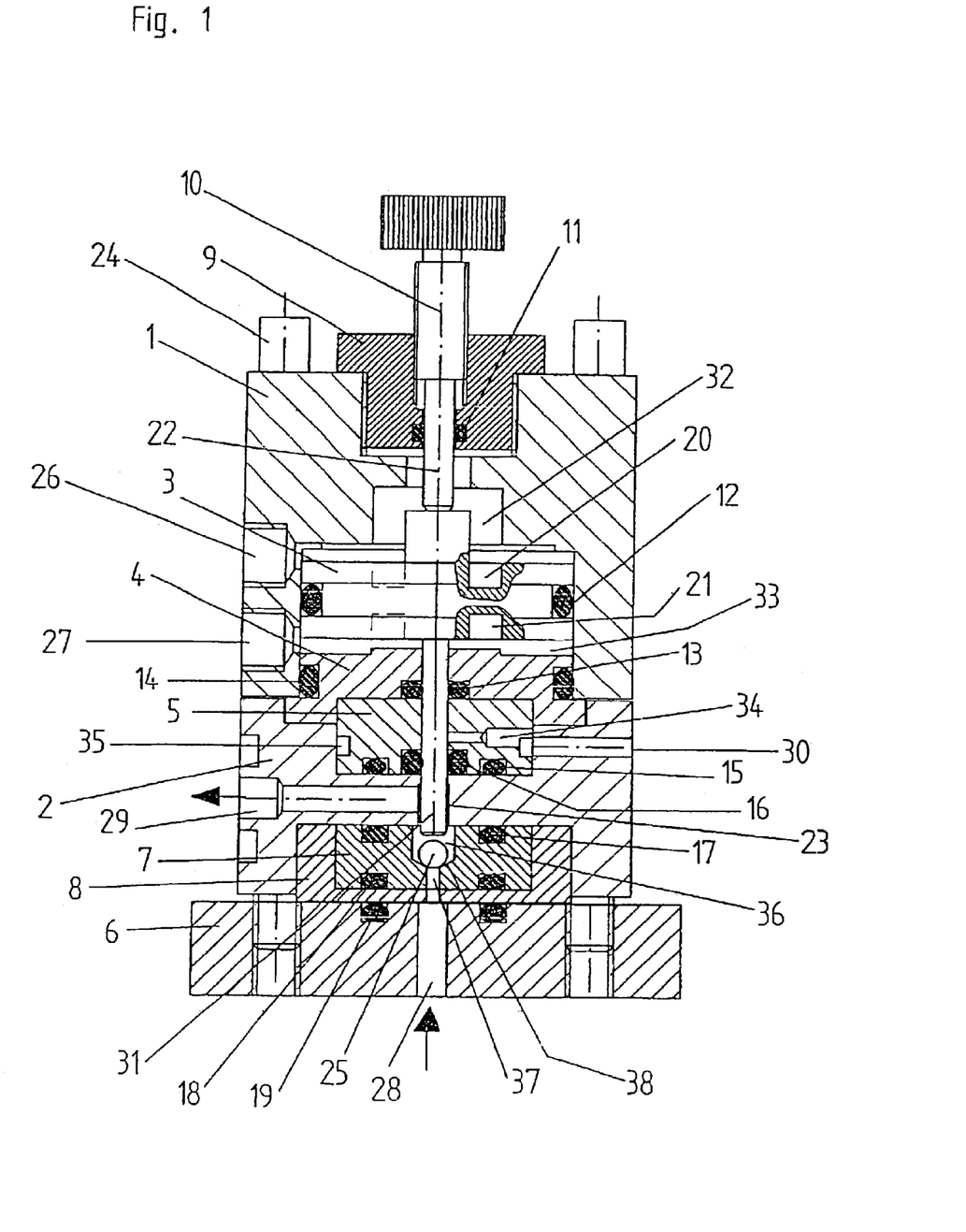
FIG. 1 depicts a sectional view through the valve with all the individual parts.

In FIG. 1 the set screw 10 is placed in the threaded ring of the adjusting screw 9. A different or a better description for the threaded ring would be: A disc with an external thread for receiving the adjusting screw.

By means of the set screw 10, the maximum travel of the pneumatic piston with the valve spindle can be reduced, so that, under high differential pressures, the piston travel between the OPEN and SHUT positions of the valve can be limited, abrasion at the spindle seal is thereby reduced and the service life of the valve is increased appreciably.

Figure 1A:
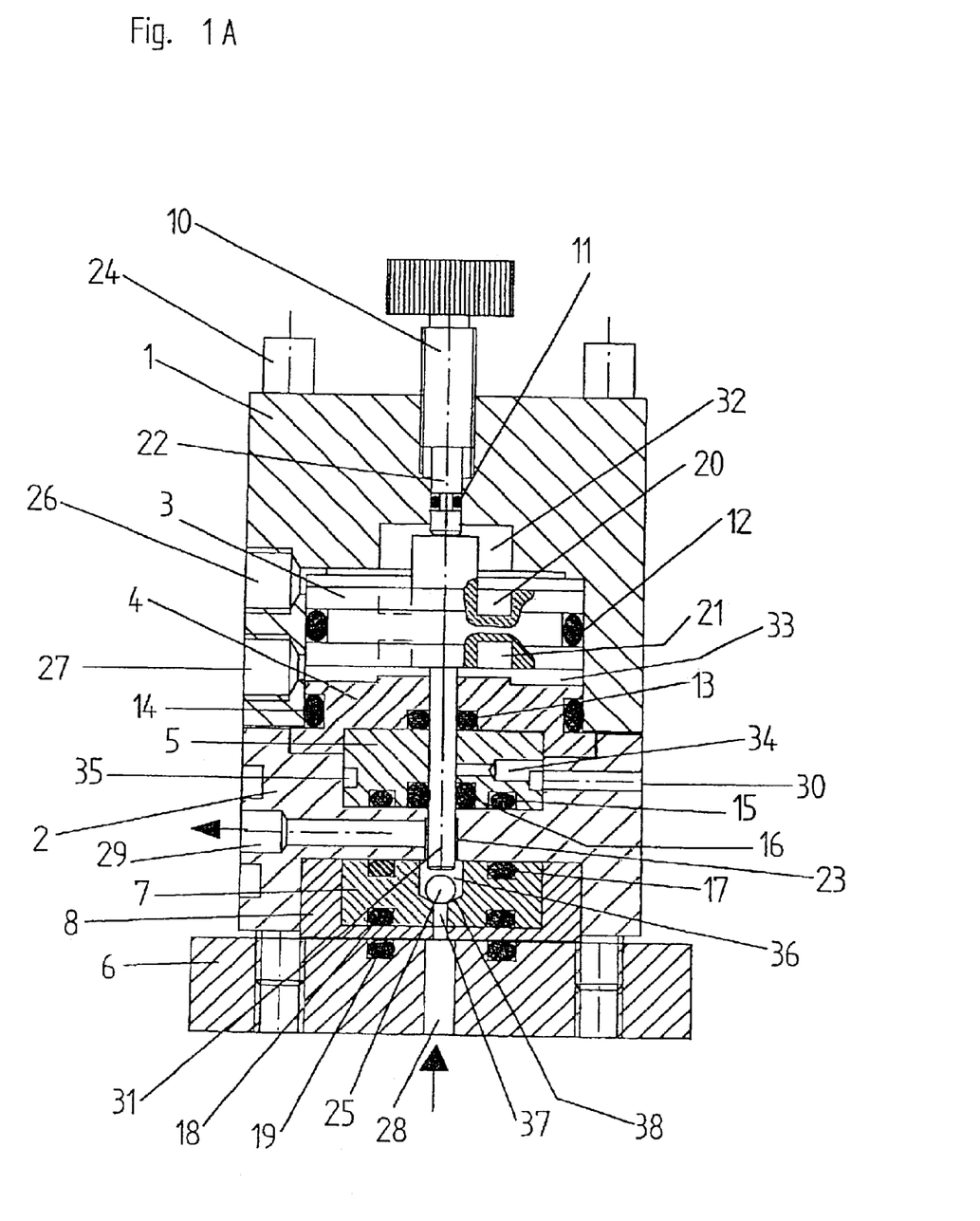
FIG. 1a according to FIG. 1 but without threaded ring 9

In an alternative of the present invention the threaded ring of the adjusting screw 9 could be omitted if the elastic seal 11 were to form an integral part of the adjusting screw 10 (see FIG. 1A).

The adjusting screw 10 comprising the elastic seal 11 is normally only necessary to adjust very short travel distances of the piston. Such very short travel distances are normally between 0.05 mm and less than 1 mm. Very short travel distances are necessary for greatly reducing the wear on the elastic seals 16 at very high differential pressures. In other words, due to the extremely short travel distance of the valve spindle, the stress on the seal is only within the deformation range of the elastic seal 16.

In addition, in the case of individual valve designs which structurally allow a longer travel distance of the piston, the adjusting screw 10 allows the travel distance to be subsequently shortened and the valve to be used at high differential pressures.

In addition, the adjusting screw allows the maximum flow volume through the valve in its installed state to be limited. During the practical work for the present invention it was found that in case the travel distances are of more than 5 mm and less than 10 mm the adjusting screw is required for adjusting the desired flow volume in the installed valve state or in the installed pipeline In case the travel distances are more than 1 mm and less than 5 mm, the adjusting screw is required for adjusting the flow volume and minimizing wear on the elastic spindle seal.

And in case the travel distances are more than 0.05 mm and less than 1 mm, the adjusted screw is required for limiting the flow volume and minimizing the wear on the seal after the valve has been installed and in the case of high differential pressures.

In a preferred version of the valve, the opening and closing travel is dimensioned such that the characteristic deformation of the elastic seals at the valve spindle and at the piston is utilized in order to open and close the valve with low wear.

The length of the piston travel is, in particular, inversely proportional to the differential pressure between the inlet orifice and the outlet orifice of the valve and is preferably at most 10 mm, particularly preferably at most 5 mm and especially particularly preferably at most 1 mm.

In a preferred version, the valve has a freely movable closing body in all directions which is seated in the extended axis of the pneumatic piston having a valve spindle elongated on one side. The closing body is seated, for example, in a depression (=bore 36) of the closing plate 4 having the valve seat 7, and the width of the concentric annular gap formed by the diameter of the depression and the diameter of the valve spindle is smaller than the diameter of the movable closing body.

The bore 36 ends up in the feeding bore 37 which passes the valve seat 7 and where the fluid that has to be ranged is sucked in from the feed line in the base-plate 6.

A valve in which the sealing-seat area of the valve seat is planar or, in particular, conically narrowed is preferred. The freely movable closing body 25 is produced preferably as a ball, cylinder, disc or cone.

In a preferred form of construction of the valve, the height of the depression in the closing plate 4 having a valve seat 7 for receiving the freely movable closing body 25 is less than twice the height of the closing body, preferably less than the height of the closing body and particularly preferably less than half the height of the closing body.

The diameter of the depression or countersunk bore in the closing plate 4 is less than twice the diameter of the closing body, preferably less than 1.5 times the diameter of the closing body and particularly preferably less than 1.3 times the diameter of the closing body.

In the case of a conically concentric sealing area in the valve, the angle α to the horizontal, i.e., the conical angle with respect to the base of the cone, is preferably 0 to 70 degrees, particularly preferably from 30 to 60 degrees and very particularly preferably from 40 to 50 degrees.

The valve seat 7 can be made of thermoplastic plastics or of corrosion resistant metal.

The closing body of the valve may be formed from various materials, such as, for example steel or elastomers such as for example Hastelloy™, glass, ceramic or plastic.

In a preferred version, the materials of the valve seat 7 and of the closing body 25 are different. Preferably, the closing body has a higher surface hardness than the valve seat.

The freely movable closing body 25 is part of the flow passage on the product side or process side of the valve.

The flow passage extends through several valve components and is composed of the feed line 28 in the base plate 6, the feed bore 37 and the widened bore 36 in the valve seat 7, the additional bore 23 in the housing plate 2 and finally the discharging bore 29 of the housing plate 2.

The feed bore 37 widens into section 36 to form the sealing surface 38 of the valve seat for later receiving the closing body 25. In the installed valve state, the additional flow passage section 23 forms, together with the valve spindle 31, the annular gap 23.

The piston positioned in the cylinder space of the head plate may be equipped with additional compression springs, in order, for example, to assume a desired safety (i.e., "fail safe") position, in the event of the failure of control air.

A valve is preferred in which the upper cavity part has mounted in it a spring element which acts on the valve spindle in the direction of the valve seat or the lower cavity part has mounted in it a spring element which acts on the valve spindle in the direction opposite to the valve seat.

In a preferred variant, the closing body, produced as a valve plate, has an additional elastic seal, in order to close the valve passage sealingly.

A version of the valve in which the fluid pressure lines are operated with compressed air is preferred.

A version of the valve in which a removable built-in filter element or screen fabric element is included in the region of the feed line, upstream of the valve seat, in particular between the baseplate and the valve seat, is preferred.

The built-in filter retains dirt particles and other hard foreign particles, so that, in particular, a soft sealing seat or elastic seals are not damaged.

The valve according to the present invention can of course be installed and used either in a vertical or a horizontal position.

The vertical position, in which the pneumatic chamber is at the top, does in particular have advantages for applications in which high differential pressures are used, since during the closing process the closing body falls directly into the valve seat and is not first of all pushed via the sealing surface 28 into the sealing seat. If the valve is installed in a horizontal position the valve spindle first of all has to push the closing body into the sealing seat since, due to gravitational forces, the freely moveable closing body always assumes a lateral position.

In addition, if the valve is in a vertical position and the pneumatic chamber is at the top it frequently exercises a dual function required by the user. These functions are a) the function of a controlled cut-off valve and b) the function of a check valve.

This dual function of the valve no longer exists if the valve is positioned in such a manner that the pneumatic chamber is located beneath the process chamber, i.e. the valve is installed after being rotated by an angle of 180°.

If the design were to be modified, a horizontal position of installation could have the effect of reducing wear.

In this case, the section of the flow passage which receives the freely movable closing body would have to be provided with vertical guiding ribs or edges. The guiding ribs would prevent the closing body from being freely movable, i.e. freely movable in all of the available spatial axes; i.e. they would only allow vertical movement. (All check valves are designed in this manner).

Ball valves have spring-loaded closing bodies. The free spatial movability of the closing body is restricted in this variant. Therefore another subject of the present invention is the use of the valve as a safety valve, overflow valve, non-return valve (i.e., a "check valve") or hand-operated fitting designed with such spring-loaded closing bodies.

A further subject of the invention is a block fitting having at least two valves according to the invention, wherein the valves have a common housing plate and have a multi-part valve body.

A further subject is a block fitting having at least two valves according to the invention, characterized in that the valves have a common housing plate, a common base-plate and/or a common head plate.

BRIEF DESCRIPTION OF THE DRAWINGS

The invention is explained in more detail below, by way of example, with reference to the figures, in which.

In the figures, the reference symbols are allocated as follows:

(List of Reference Symbols)

1 Head plate
2; 2' Housing plate
3 Piston
4 Closing plate
5 Centering plate
6 Baseplate
7 Valve seat
8 Housing of the valve seat
9 Threaded ring of the adjusting screw
10 Adjusting screw
11 Seal of the adjusting screw
12 Piston seal
13 Piston-spindle seal
14 Outer closing-plate seal
15 Centering-plate seal relative to the housing
16 Valve-spindle seal of the centering plate
17 Upper valve-seat seal
18 Lower valve-seat seal
19 Seal between base-plate and valve-seat housing
20 Concentric groove for receiving a spring having a SHUT action
21 Concentric groove for receiving a spring having an OPEN action
22 Round bolt on the adjusting spindle
23 Annular gap
24 Screws
25–25''' Movable closing body
26 Energy connection
27 Energy connection
28 Feed line in the baseplate
29 Discharging bore in the housing
30 Radial housing bore
31 Valve spindle or piston spindle
32 Upper pneumatic space
33 Lower pneumatic space
34 Radial bore of the centering plate
35 Peripheral groove of the centering plate
36 Bore(countersinking, depression) for receiving the closing body
37 Feeding bore
38 Conical concentric sealing area in the valve seat
40 Overflow valve
41A Compression spring (overflow valve) with spring force 1
41B Compression spring with spring force 2
42 Inner valve-seat seal
43 Disc
44 Filter fabric

EXAMPLES

Example 1

FIG. 1 shows a sectional illustration of a valve with an integrated pneumatic adjusting drive. The valve has three main plates, the head plate 1, the housing plate 2 and the base-plate 6. All the plates are held together, for example, by means of four screws 24, or by bolts, etc.

The head plate 1 has, inside it, a stepped bore. The bore forms the cavity 32, 33, referred to below as the pneumatic space. The pneumatic space 32, 33 of the head plate 1 provides space for receiving a piston 3 with a valve spindle 31 attached on one side. The piston 3 has, on its circumference, a groove for receiving the elastic piston seal 12. The piston seal 12 and the piston 3 divides the pneumatic space 32, 33 into a lower cavity 33 and an upper cavity 32 (also referred to as the lower and the upper pneumatic space).

The lower pneumatic space 33 ends with the centering closing plate 4 and is sealed with an associated outer seal 14 to the inner bore of the head plate 1. The piston-spindle seal 13 seals off the lower pneumatic space 33 relative to the valve spindle 31, so that the lower pneumatic space is closed against pressure.

The upper pneumatic space 32 and the lower pneumatic space 33 have in each case feeding or discharging connections 26, 27 for fluids, for example compressed air. Thus, depending on the open or shut position of the valve, the required adjusting force, for example by means of compressed air of 6 bar, can selectively be conducted in each case through the line 27 to the active lower piston area or through the line 26 to the upper piston area, so that the piston 3 is pressed into the desired end position by means of the valve spindle 31.

The closing plate 4 and the inner centering plate 5 center the head plate 1 and the housing plate 2 with one another, so that the valve spindle 31 attached to the pneumatic piston 3 on one side can be projected spindle, through the center of the valve body, into the flow passage 28, 29, near to the movable closing body 25 (steel ball).

The lower plane of the centering plate 5 is seated closely in the housing plate 2 and the upper region of the centering plate 5 is seated closely in the closing plate 4, so that the valve spindle 31, by means of the seal 16, seals off the flow passage from leaking along the spindle. The centering plate 5 has a further seal 15 relative to the housing plate 2, in order to prevent a bypass leakage. Above the piston-spindle seal 16 is provided a radial bore 34 which issues into a peripheral groove 35. The peripheral groove 35 adjoins a radial housing bore 30. The portion of the valve spindle between the seal 13 and the seal 16 is thereby freely vented (pressure relief space). As a result, in the event of a failure of the valve-spindle seals 13, 16, a pressure which arises can be relieved directly. This also affords the user the possibility to check the leak-tightness of the valve.

The housing plate 2 is seated on the base-plate 6 and in its lower part has a bore for receiving the valve seat 7. If the valve seat 7 is manufactured from plastic, as shown in the example according to FIG. 1, it may be necessary, particularly under high process pressures, to chamber the plastic valve seat 7 with an additional housing 8. The valve seat 7 has an upper central bore 36 for receiving the freely movable closing body 25 and, in the extension of the bore axis, an adjoining smaller bore 37, through which the substance flowing through is conducted from the feed line 28 (i.e., the inlet of the flow passage through the valve). A conical concentric sealing area 38 is formed in the transitional region of the bores 36, 37, so that the closing body can be centered in the middle and sealed off. The valve seat, here, is a disc which, on the upper plane, has a seal 17 preventing a bypass flow in relation to the housing plate 2. A further seal 18 is placed between the valve seal 7 and the surrounding housing 8.

The base-plate 6 is sealed off relative to the housing 8 of the valve seat 7 by means of the seal 19, so that a prevailing pressure in the valve feed line 28 has to pass the valve seat 7 in order to be capable of leaving the valve through the discharging bore 29 in the housing 2. The flow passage is formed, here, by the lines 28, 29 and the bores 36, 37.

A threaded bore is additionally provided in the vertical axis of the head plate 1, in order to receive a threaded ring or bushing 9. This ring or bushing 9 serves for receiving the adjusting spindle 10 having a stepped round bolt 22. The bolt 22 extends into the upper pneumatic space and is sealed off relative to the outside by means of the seal 11. The adjusting spindle with a stepped bolt forms the upper stop for the piston movement and, by means of the valve spindle 31 seated on the piston 3, limits the maximum opening travel of the freely movable closing body. The lower stop point of the freely movable closing body is formed by the conically concentric sealing area 38. The lower stop point is the SHUT position and the upper stop point the OPEN position of the valve.

The valve functions as follows: when process pressure prevails in the inlet bore or duct 28 of the base-plate 6, a flow through the valve is prevented when, for example, compressed air is present in the upper pneumatic space 32 via the energy connection 26 and a corresponding closing force is applied. The compressed air or the resultant closing force causes the pneumatic piston 3 having the attached valve spindle 31 to be pressed down, so that the lower area of the valve spindle 31 presses the freely movable closing body 25 into the concentric sealing seat 38 with the prevailing force of the piston 3. The force acting on the pneumatic piston is higher than the prevailing pressure force, acting via the inlet 28, below the closing body. When the compressed air is switched to the lower pneumatic space 33 and at the same time the upper pneumatic space 32 is relieved of pressure, the pneumatic piston 3 rises until it touches the lower area of the bolt 22 of the adjusting spindle 10. At the same time, the possibility of movement of the freely movable closing body 25 is afforded, so that, with pressure prevailing under the closing body 25, the latter is pressed up and opens the flow passage 28, 29. The product or medium present can then flow around the closing body 25, past the annular gap 23, which is formed by the round piston spindle and the larger vertical discharge duct, to then enter the discharging bore 29 of the flow passage.

In special applications, controllable valves are required which switch into a defined safety position (i.e., "fail safe") in the event of the failure of control air. The OPEN or SHUT safety positions of a valve are normally required in the event of the failure of control air. The piston 3 having the valve spindle 31 attached on one side possesses, in the upper or lower pneumatic space, a concentric groove 20, 21 for selectively receiving a compression spring 41A (cf. FIG. 5). In the event of the failure of the control air present in the lower pneumatic space, a mounted tensioned compression spring 41A in the upper pneumatic space 20 forces a closing movement of the valve. If the compression spring is seated in the lower pneumatic space in the receiving groove 21 the opening of the valve by means of a spring force will occur in the event of the failure of control air in the upper pneumatic space.

Example 2

Figure 2:
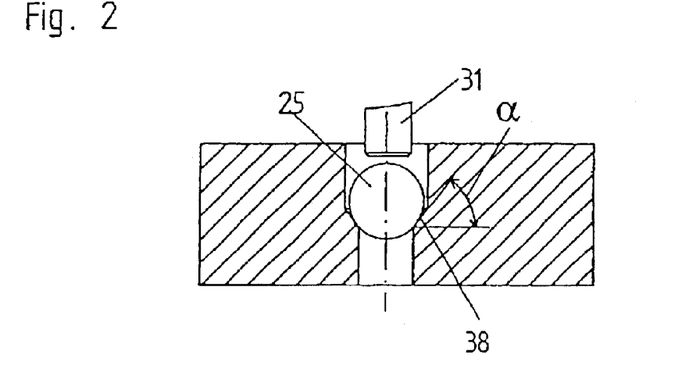
FIG. 2 depicts various embodiments of the closing body and of the depression in the valve seat
Figure 2A:
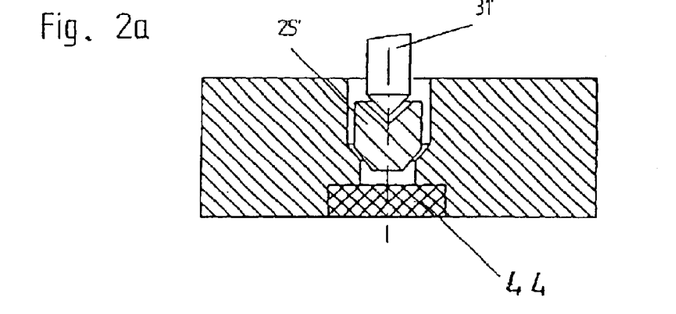
Figure 2B:
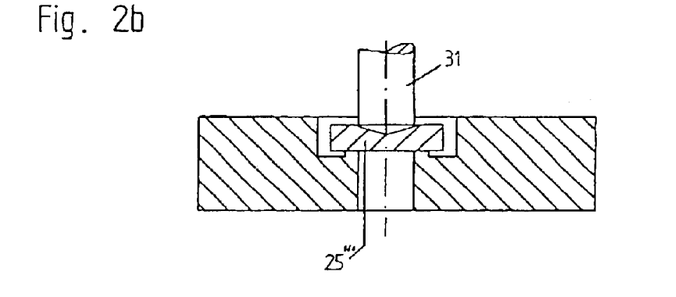
Figure 2C:
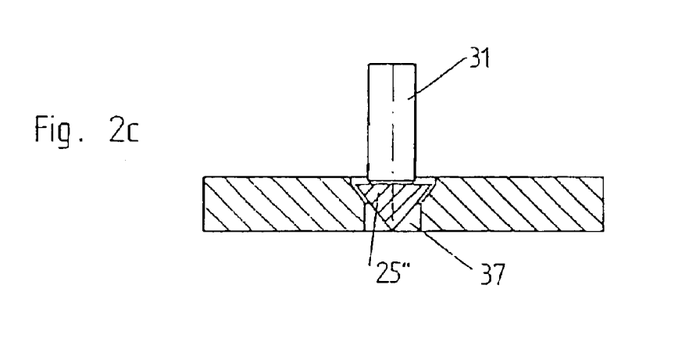

FIGS. 2 to 2c illustrate various embodiments of the valve-sealing seat 7 in a valve according to FIG. 1

FIG. 2 shows the angle α of the conical sealing area 38, the closing body 25 and part of the valve spindle 31

FIG. 2a shows a version with a conical closing body 25' and with a centering pin on the valve spindle 31'

FIG. 2b shows a plate-shaped closing body 25'" with a centering pin on the valve spindle 31

FIG. 2c shows a pointed conical closing body 25" which in the closed state projects predominantly into the feed duct 37 (bore).

Example 3

Figure 3:
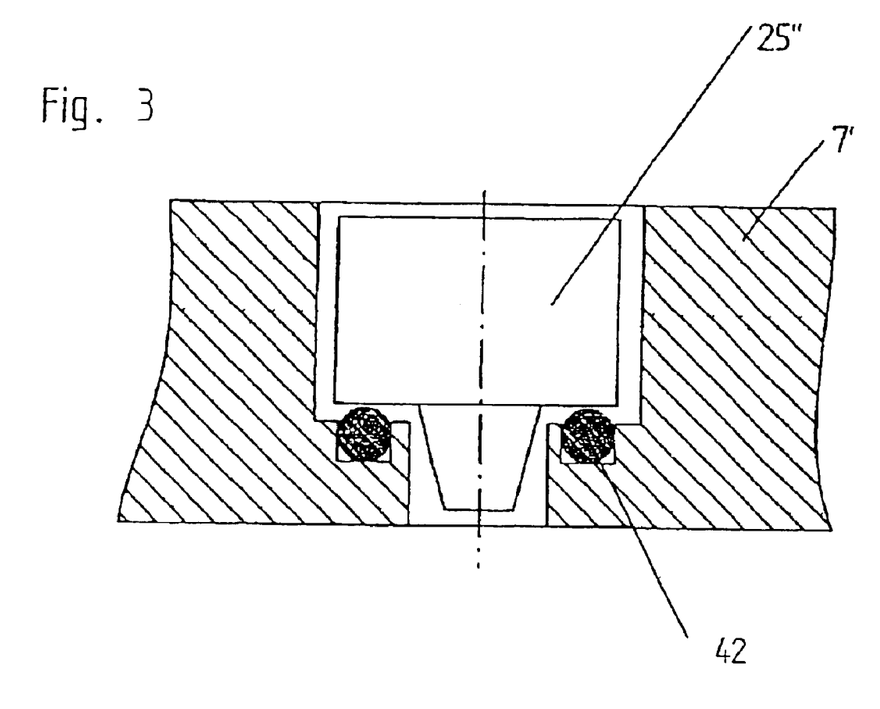
FIG. 3 depicts a closing body with an elastic seal and a valve seat

FIG. 3 shows an alternative valve seat 7' for a valve according to FIG. 1, with an elastic inner valve-seat seal 42.

The freely movable closing body 25" is in the form of a rotationally symmetrical cylinder stepped on one side and having an attached guide cone. The receiving bore for the closing body 25" is part of the valve seat 7. If an inner elastic seal is used in the valve seat 7', the closing body and the valve seat may be made from the same material.

Example 4

Figure 4:
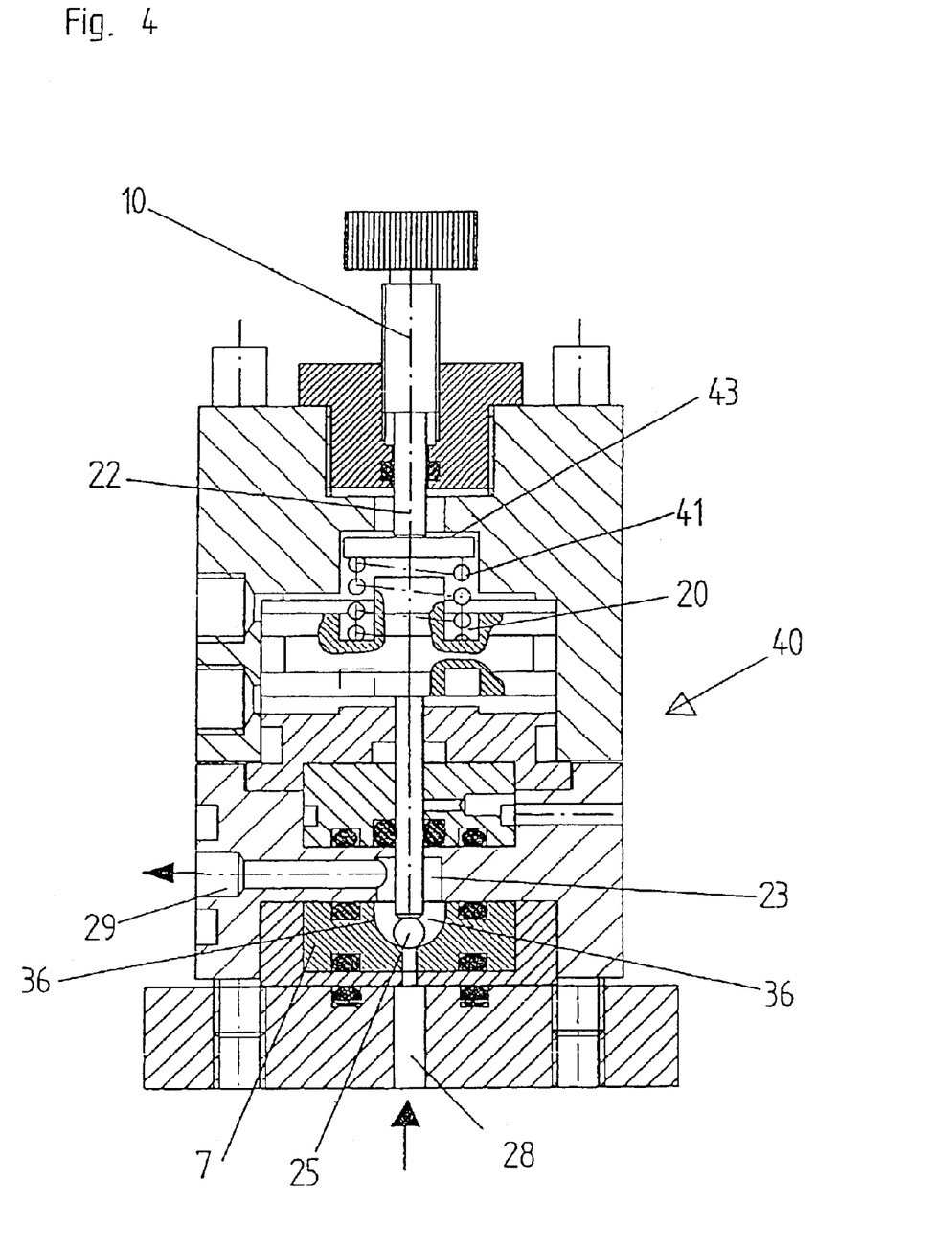
FIG. 4 depicts a modified valve as a spring-loaded overflow valve

FIG. 4 illustrates a modularly assembled valve, similar to that in Example 1, converted into a spring-loaded overflow valve 40 by the addition of a compression spring 41A, which is partially guided, for example, in a concentric groove 20 of the piston 3, and by the use of an additional disc 43 and the omission of the elastic seal 12, 13, 14 in the pneumatic space. In the version shown, the depression 36 in the valve seat 7 is a spherical countersink and the freely movable closing body 25 has a spherical form. The compression spring 41A used can be tensioned to a desired opening force by means of the adjusting screw 10, so that, when the spring force is exceeded, the prevailing pressure in the feed duct 28 compresses the tensioned spring 41A, pushes up the closing body 25 and opens the sealing area 38 in the valve seat 7 for a throughflow. The pressure in the feed line 28 can then be relieved through the concentric annular gap 23 to the discharging bore 29. When the prevailing pressure is lower than the spring pressure force, the overflow valve 40 is closed again.

FIG. 5

Figure 5:
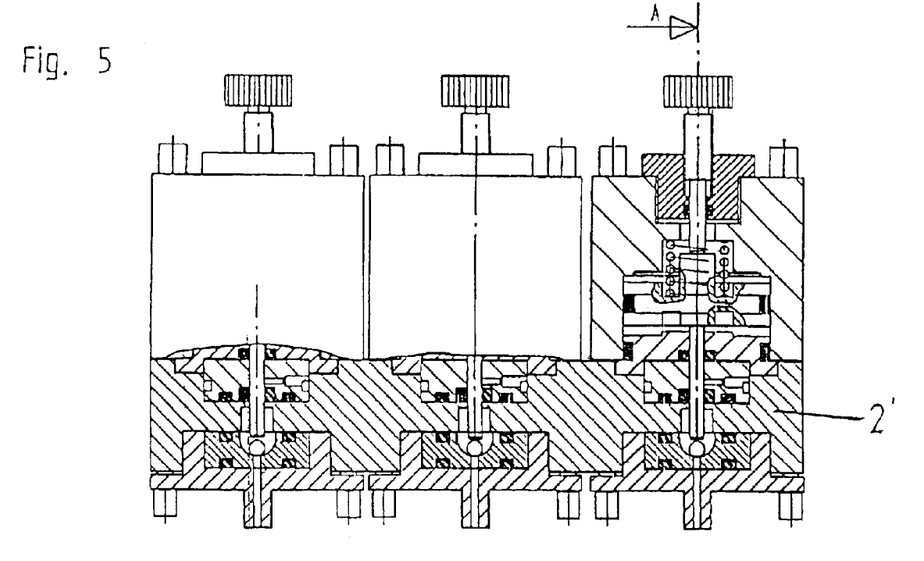
FIG. 5 depicts a plurality of valves which possess, for example, a common housing plate and perform various functions.
Figure 5A:
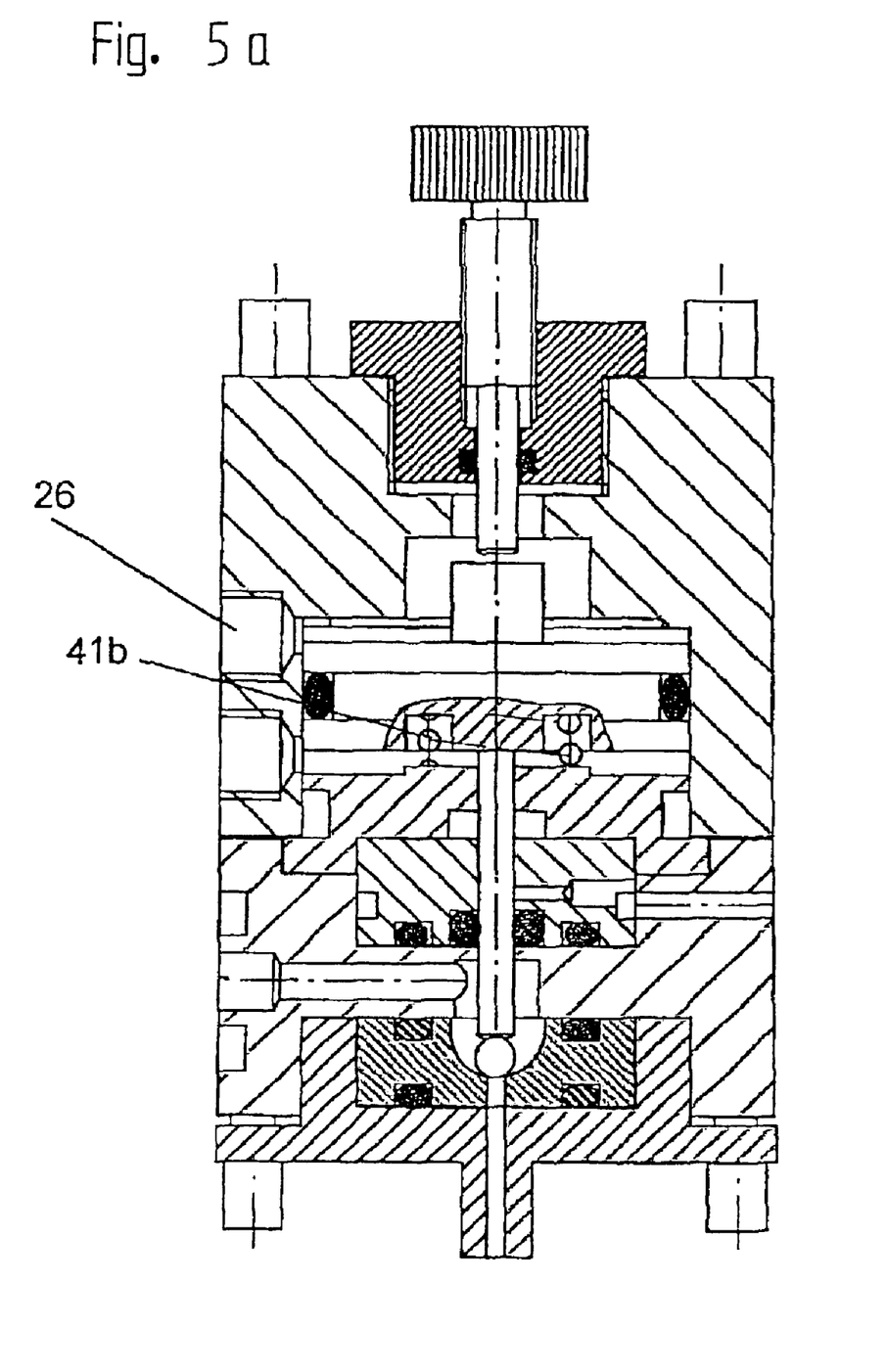
FIG. 5a with compression spring 41b for the function: Control air failure opening
Figure 5B:
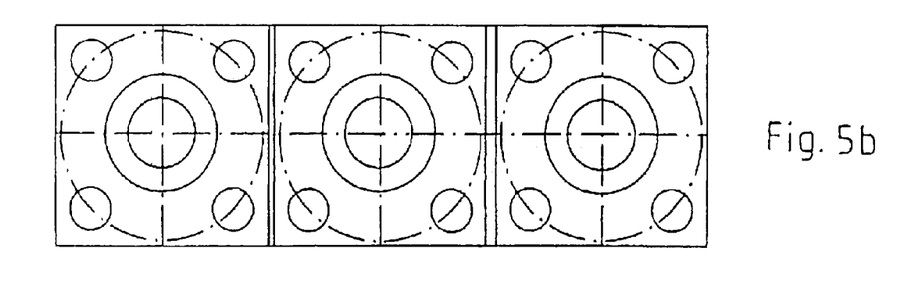
FIG. 5b is a top view of three modularly assembled valves.

In FIG. 5, a plurality of modularly assembled valves are set up in a space-saving way on a common housing plate 2' in order to form a block fitting. A valve similar to that in Example 1 is illustrated in the right-hand mounting position, but, in the upper pneumatic space, a compression spring is used which moves the valve into the SHUT safety position in the event of the failure of control air. FIG. 5b illustrates three valves in a top view. FIG. 5a illustrates the valve with a compression spring 41b used to move the valve into the OPEN safety position in the event of a failure of control air.

Test results with valves according to the invention, as shown in FIG. 1, and with various known valves are shown in the following Table 1.

TABLE 1

| Company (manufacturer) | Type | Valve test Hydrogen 300 bar | |
|---|---|---|---|
| | | Switching cycles | Result: Suspension of test/sundry |
| Nupro | Bellows-type value* | 5–10,000 | Valve seat defective |
| Parker | Diaphragm value* | 3200 | Drive problems, defective |
| Nupro valve modified | Bellows-type value | 13,000 | Without bellows with O-ring seal, valve tappet jams in O-ring |
| Hoke | Diaphragm value* | <2000 | Leakage in valve passage |
| Valve according to the invention (FIG. 1) | | >100,000 | Satisfactory operation and leak-tight |

*A plurality of valves (at most three) of each valve type were tested at the same time in order to rule out an individual fault on the valve. The valves marked were tested only up to 240 bar (maximum permissible operating pressure).

We claim:

1. A modular, actuated valve, comprising a head plate 1 mounted on a housing plate 2 which is mounted on a base plate 6, said plates being sealed and held together by fixing elements the head plate having a bore which forms a pneumatic space; a piston disposed within said pneumatic space, and dividing said pneumatic space into an upper pneumatic space 32 and a lower pneumatic space 33, an upper fluid pressure line 26 connected to said upper pneumatic space 32 and a lower fluid pressure line 27 connected to said lower pneumatic space, a valve spindle 31 attached to said piston, a closing plate 4 having a bore for passage of said spindle and closing said lower pneumatic space 33 and a spindle seal 13 to seal the lower pneumatic space relative to the spindle 31; an inner centering plate 5 having an upper side and a lower side, the upper side being seated in said closing plate 4 and the lower side being seated in said housing plate 2, said inner centering plate 5 having a bore for passage of said spindle 31, a spindle seal 16 and a radial bore 34 communicating with said bore for passage of said spindle 31, a peripheral grove 35 on the periphery of said inner centering plate 5, said peripheral grove 35 communicating with said radial bore 34 and with a radial housing bore 30 passing through said housing plate 2, said spindle passing along the bores in said closing plate 4 and centering plate 5 to a flow passage defined by an inlet bore 28 through said base plate 6 and an outlet bore 29 through said housing plate 2 communicating with each other; a primary bore in said base plate 6 for receiving a valve seat 7, a valve seat 7 disposed within said primary bore and having an upper central bore 36 for receiving a freely movable closing body 25 and an adjoining further bore 37 through which said upper central bore 36 communicates with said inlet 28, with a sealing area 38 between said upper central bore 36 and said further bore 37, adapted to be sealed off by said freely movable closing body 25, said spindle 31 being movable towards and against said freely moving body 25 to force it against said sealing area 38 thereby closing said further bore 37, and thus said fluid passage, or away from said freely movable body thereby freeing said freely movable body to move off of said sealing area 38 to open said fluid passage.

2. Valve according to claim 1, wherein the area of the piston 3 which is acted upon with pressure by the pressure fluids is dimensioned, in relation to the cross section of the area of the valve seat 7, at least such that, when the upper cavity 32 is acted upon by pressure, the valve spindle 31 counteracts the pressure in the inlet region 28 of the flow passage 28, 29.

3. Valve according to claim 1, wherein the seals 13 and 16 are produced, independently of one another, as elastic, sliding seals.

4. Valve according to claim 3, wherein said seals are formed of an elastomer, silicone, fluoroelastomer, polytetrafluoroethylene or an EPDM rubber.

5. Valve according to claim 1, wherein the valve seat 7 is releasably mounted in housing plate 2.

6. Valve according to claim 1, wherein said bore in said head plate is a stepped bore, and accommodates a set screw 10, which variably limits the stroke of the valve spindle 31.

7. Valve according to claim 6, wherein said set screw is a micrometer screw.

8. Valve according to claim 1, wherein a spring element 41A, which forces the valve spindle 31 in the direction of the valve seat 7, is mounted in the upper cavity part 32.

9. Valve according to claim 1, wherein a spring element 41B, which forces the valve spindle 31 in the opposite direction to the valve seat 7, is mounted in the lower cavity part 33.

10. Valve according to claim 1, wherein the sealing-seat area 38 of the valve seat 7 is planar and conically narrowed towards said further bore 37.

11. Valve according to claim 1, wherein a freely movable closing body 25 is placed in said upper central bore 36 and said freely movable closing body 25 is a ball, cylinder or cone.

12. Valve according to claim 11, wherein said upper central bore 36 has a depth of at most twice the height of the freely movable closing body 25.

13. Valve according to claim 12, wherein said depth is at most equal to the height of said freely movable closing body 25.

14. Valve according to claim 13, wherein said depth is at most equal to one-half the height of said freely-movable closing body 25.

15. Valve according to claim 11, wherein the diameter of the upper central bore 36 is less than twice the diameter of the closing body 25.

16. Valve according to claim 1, wherein the ratio of the cross-sectional areas of the piston 3 to the cross-sectional area of the spindle tip of valve spindle 31 which is movable against the freely movable closing body 25 is <100.

17. The valve according to claim 16, wherein said ratio is <50.

18. The valve according to claim 13 wherein said ratio is <20.

19. Valve according to claim 1, wherein the length of movement of the piston 3 is limited to at most 10 mm.

20. The valve according to claim 19, wherein said length of movement is at most 5 mm.

21. The valve according to claim 20, wherein said length of movement is at most 1 mm.

22. Valve according to claim 1, wherein said sealing area 38 tapers conically, and the angle α of the taper is up to 70°.

23. Valve according to claim 22, wherein said angle of taper is 30 to 60°.

24. Valve according to claim 23, wherein said angle of taper is 40 to 50°.

25. Block fitting according to claim 22, wherein said valves additionally have a common head plate 1 and base-plate 6.

26. Valve according to claim 1, wherein the valve seat 7 is constructed of a material which has a lower hardness than the material of which closing body 25 is constructed.

27. Valve according to claim 1, wherein the fluid pressure lines 26 and 27 are adapted to accommodate compressed air.

28. Valve according to claim 1, further comprising a removable filter element or screen-fabric element 44 positioned to filter material entering inlet 28 before said material reaches valve seat 7.

29. Block fitting, having at least two valves according to claim 1, wherein said valves have a common housing plate 2'.

* * * * *

UNITED STATES PATENT AND TRADEMARK OFFICE
CERTIFICATE OF CORRECTION

PATENT NO. : 6,840,495 B2
DATED : January 11, 2005
INVENTOR(S) : Jahn et al.

It is certified that error appears in the above-identified patent and that said Letters Patent is hereby corrected as shown below:

Column 7,
Line 38, "installed pipeline" should read -- installed pipeline. --.

Column 11,
Line 24, "projected spindle, through" should read -- projected, through --.

Column 13,
Lines 50-51, "Bellows-type value*" should read -- Bellows-type valve* --.
Lines 52-53 and 57-58, "Diaphragm value*" should read -- Diaphragm valve* --.
Lines 54-55, Bellows-type value" should read -- Bellows-type valve --.

Signed and Sealed this

Twenty-first Day of March, 2006

JON W. DUDAS
*Director of the United States Patent and Trademark Office*